INVENTORS
ROBERT E. GOLDSCHMIDT
DON M. POWERS

Robert W. Berray
ATTORNEY

MULTIPLIER

MULTIPLIER DECODER RULES

April 21, 1970 R. E. GOLDSCHMIDT ET AL 3,508,038

MULTIPLYING APPARATUS FOR PERFORMING DIVISION USING SUCCESSIVE APPOXIMATE RECIPROCALS OF A DIVISOR

Filed Aug. 30, 1966 9 Sheets-Sheet 4

April 21, 1970 R. E. GOLDSCHMIDT ET AL 3,508,038

MULTIPLYING APPARATUS FOR PERFORMING DIVISION USING SUCCESSIVE APPOXIMATE RECIPROCALS OF A DIVISOR

Filed Aug. 30, 1966

9 Sheets-Sheet 6

FIG. 10

OPERAND ALIGNMENT FOR DIVIDE ITERATIONS

| MULTIPLICAND BIT POSITIONS | 0 | 1 | 2 | 3 | 4 | 5 ... | 11 | 12 | 13 ... | 20 | 21 | 22 .. | 29 | 30 | 31 ... | 57 | 58 | 59 | 60 | 61 | 62 |
|---|---|---|---|---|---|---|---|---|---|---|---|---|---|---|---|---|---|---|---|---|---|
| FROM | | | | | | | | | | | | | | | | | | | | | |
| $D_0$ BIT POSITIONS | 01 | 02 | 03 | 04 | 05 | 06 ... | 12 | 13 | 14 ... | 21 | 22 | 23 ... | 30 | 31 | 32 ... | 58 | 59 | Z | Z | Z | Z |
| $D_1$ CPA 23 BIT POSITIONS | Z | Z | Z | Z | Z | 00 ... | 06 | 07 | 08 ... | 15 | 16 | 17 ... | 24 | 25 | 26 ... | 52 | 53 | 54 | 55 | 56 | 57 |
| $D_2$ CPA 23 BIT POSITIONS | Z | Z | Z | Z | Z | Z ... | Z | 00 | 01 ... | 08 | 09 | 10 ... | 17 | 18 | 19 ... | 45 | 46 | 47 | 48 | 49 | 50 |
| $D_3$ CPA 23 BIT POSITIONS | Z | Z | Z | Z | Z | Z ... | Z | Z | Z ... | Z | 00 | 01 ... | 08 | 09 | 10 ... | 36 | 37 | 38 | 39 | 40 | 41 |
| $D_4$ CPA 23 BIT POSITIONS | Z | Z | Z | Z | Z | Z ... | Z | Z | Z ... | Z | Z | Z ... | Z | 00 | 01 ... | 27 | 28 | 29 | 30 | 31 | 32 |

| DECODER 32 BIT POSITIONS | 0 | 1 | 2 | 3 | 4 | 5 | 6 | 7 | 8 | 9 | 10 | 11 | 12 |
|---|---|---|---|---|---|---|---|---|---|---|---|---|---|
| FROM | | | | | | | | | | | | | |
| DIV 1 TABLE LOOK UP POSITIONS | Z | W | 01 | 02 | 03 | 04 | 05 | 06 | 07 | 08 | 09 | 10 | Z |
| DIV 2 COMPLEMENT OF CPA POSITIONS | 05 | 06 | 07 | 08 | 09 | 10 | 11 | 12 | 13 | 14 | W | W | W |
| DIV 3 COMPLEMENT OF CPA POSITIONS | 12 | 13 | 14 | 15 | 16 | 17 | 18 | 19 | 20 | 21 | 22 | 23 | W |
| DIV 4 COMPLEMENT OF CPA POSITIONS | 21 | 22 | 23 | 24 | 25 | 26 | 27 | 28 | 29 | 30 | 31 | 32 | W |
| DIV 5a COMPLEMENT OF CPA POSITIONS VIA REGISTER 31 | 54 | 55 | 56 | 57 | 58 | 59 | 60 | 61 | 62 | 63 | 64 | W | W |
| DIV 5b COMPLEMENT OF CPA POSITIONS VIA REGISTER 31 | 42 | 43 | 44 | 45 | 46 | 47 | 48 | 49 | 50 | 51 | 52 | 53 | 54 |
| DIV 5c COMPLEMENT OF CPA POSITIONS VIA REGISTER 31 | 30 | 31 | 32 | 33 | 34 | 35 | 36 | 37 | 38 | 39 | 40 | 41 | 42 |

Z--THIS BIT HAS VALUE ZERO
W--THIS BIT HAS NONZERO VALUE

DIVIDE TIMING

United States Patent Office
3,508,038
Patented Apr. 21, 1970

3,508,038

MULTIPLYING APPARATUS FOR PERFORMING DIVISION USING SUCCESSIVE APPROXIMATE RECIPROCALS OF A DIVISOR

Robert E. Goldschmidt, Wappingers Falls, and Don M. Powers, Poughkeepsie, N.Y., assignors to International Business Machines Corporation, Armonk, N.Y., a corporation of New York Filed Aug. 30, 1966, Ser. No. 576,157
Int. Cl. G06f 7/39
U.S. Cl. 235—164 6 Claims

ABSTRACT OF THE DISCLOSURE

On successive cycles of operation, the multiplying apparatus is used for generating an approximate reciprocal of the divisor, and then the approximate reciprocal is utilized for multiplication with the dividend. By utilizing a carry save adder tree feeding a carry save adder loop, each being comprised of various latched circuits, the entire apparatus can be simultaneously performing the modification of the divisor reciprocal and performing a subsequent multiplication operation.

The structure shown in copending application Ser. No. 576,401 by Robert E. Goldschmidt et al., filed Aug. 31, 1966, entitled "Apparatus for Accumulating the Sum of a Plurality of Operands," assigned to the assignee of this application, is adapted for the performance of division.

This invention relates to apparatus for dividing a fractional binary dividend by a fractional binary divisor wherein the quotient is developed by performing successive multiplications of the dividend and approximate reciprocals of the divisor.

In large-scale and high-speed data processing systems, a great deal of concern is given to speeding up multiply and divide for large binary numbers. Over and over addition for multiply or over and over subtraction for division becomes too time-consuming in large data processing system environments. High-speed multiply apparatus can be built in which a plurality of multiplier bits can be examined simultaneously in a succession of groups wherein each group of multiplier bits is capable of designating a plurality of multiples of a multiplicand. The plurality of multiples can then be added together in an adder arrangement to produce a final product for the multiplier bits examined. As successive groups are examined, the previously generated product is added to tthe successive products generated. For such a high-speed multiplier, it would be desirable to be able to utilize this apparatus to perform division. It is well known in division, that a quotient will be produced when the dividend is multiplied by the reciprocal of the divisor. However, in data processing apparatus which contains separate high-speed multiplying apparatus, great difficulty would be encountered to obtain the reciprocal of a divisor prior to utilizing the multiply apparatus.

It is a primary object of the present invention to provide apparatus whereby high-speed multiplication apparatus can be utilized for division.

It is another object of this invention, to provide apparatus whereby high-speed multiplication apparatus can be used to develop successive approximate reciprocals of a divisor while simultaneously multiplying the dividend and the successive approximate reciprocals of the divisor previously developed.

It is also an object of the present invention to provide multiplication apparatus wherein the multiplying apparatus concurrently develops independent product factors from independent input factors.

An additional object of the invention is to provide apparatus wherein independent multiply operations take place concurrently in the same hardware, and wherein the product of one multiply operation is utilized as an input factor for a succeeding multiply operation.

The foregoing objects are achieved in a preferred embodiment of the invention which utilizes a high-speed multiplying apparatus comprised of a multiplier register and decoder. The multiplier register receives a plurality of multiplier bits which are decoded to generate signals indicating a plurality of multiples of a multiplicand which should be added to produce a product. There is also provided multiplicand input means and an adder apparatus adapted to receive a plurality of multiples of a multiplicand to produce at its output the product of the multiplicand and the multiplier bits decoded. An intermediate stage of the adder apparatus is comprised of latch devices whereby an intermediate result representing the product is temporarily stored prior to entry to the final stages of the adder apparatus. At the time the intermediate latch stage receives inputs, new inputs can be applied to the input of the adder.

The divide operation includes a number of iterations each of which includes a plurality of multiply cycles. To start the divide, a pre-determined number of high-order bits of a divisor are translated to an approximate reciprocal of the divisor which are, in turn, transferred to the multiplier register. This first intermediate reciprocal is then utilized as a multiplier and the divisor is entered into the multiplicand input means to initiate a multiply cycle for the divisor. When the divisor multiply cycle intermediate result is stored in the intermediate storage of the add apparatus, the dividend or numerator is transferred to the multiplicand input gate and a cycle of multiplication of the approximate reciprocal and the numerator is initiated at the input of the adder. At the time the final product of the divisor multiply cycle emerges from the adder apparatus, the intermediate results of the multiply cycle on the numerator will be entering the latch stage of the adder apparatus. The final output of the adder of the first multiply cycle of the first iteration, which represents a new intermediate divisor, is transferred both to tthe multiplicand input means and the multiplier decoder register. A certain number of binary bits of the intermediate divisor are complemented and shifted prior to entry into the multiplier decoder such that a new approximate reciprocal is entered into the multiplier decoder register. The output of the adder apparatus which represents the intermediate divisor is also sent to the multiplicand input means and shifted a same amount in the opposing direction and a divisor multiply cycle is initiated for a second divide iteration. Subsequently, the adder apparatus output will represent the product of the dividend times the first approximate reciprocal and this value is transferred to the multiplicand input means for use during the second iteration.

Successive approximate reciprocals are generated and entered into the multiplier decoder register. Each of these reciprocals is then utilized to produce a new intermediate divisor which thereby produces a new reciprocal, and a new intermediate dividend. The successive multiplications of the intermediate divisors and the intermediate approximate reciprocals causes the product of these values to approach a value equal to one. After a number of iterative operations of divide, the intermediate divisor approaches a value of one within the accuracy of the original operand lengths. The succeeding output of the adder apparatus, which is a product of an intermediate dividend times a divisor reciprocal will represent the quotient of the divide operation.

The above described operation is effective when utilizing short precision floating point binary numbers wherein the fraction portion of the number is represented by 24 binary bits. When a long precision floating point number of 56 binary bits is to be divided, the last intermediate divisor produced for a short precision operation is transferred to a register to be used as a multiplier of the subsequently produced intermediate dividend. At this point, the multiply apparatus is utilized as in a normal multiply wherein successive groups of multiplier bits are transferred from the register to the multiplier decoder register to perform a multiply operation of the contents of the register and the intermediate dividend which would normally have been utilized to represent the quotient in a short precision operation.

The foregoing and other objects, features and advantages of the invention will be apparent from the following more particular description of a preferred embodiment of the invention, as illustrated in the accompanying drawings.

In the drawings:

FIGURE 10 is a diagram which illustrates bit positions of reciprocals sent to the multiplier decoder register and the bit positions of intermediate divisors and dividends sent to a multiplcand input means for various iterations of a divide operation.

Figure 1:
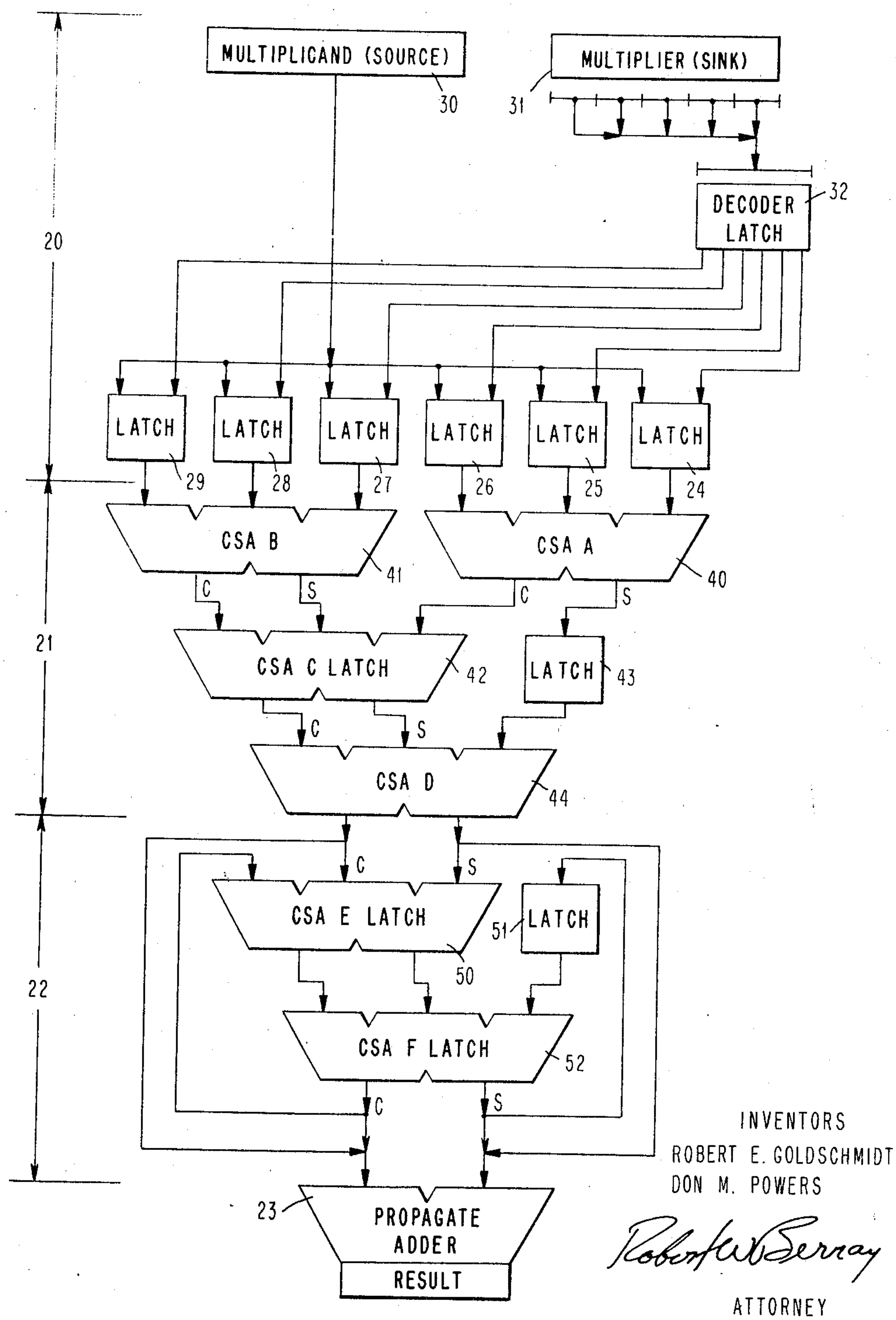
FIGURE 1 is a block diagram representation of the adder apparatus of the present invention.

FIGURE 1 depicts in block diagram form the essential functional units of the adder apparatus of the present invention. The general areas of the apparatus to be more fully described include operand input means 20, and adder tree 21, and adder loop 22, and a parallel propagate adder 23. Although the preferred embodiment of the present invention will be discussed in an environment wherein it is utilized to accomplish high-speed multiplication or division, the essential features of the invention can be utilized to add a plurality of operands no matter what their source. The discussion of FIGURE 1 will be confined to the manner in which the structure accomplishes addition, whereas the environment of the adder arrangement in a multiply operation will be discussed with FIGURE 2. In FIGURE 1, the operand input means means comprises a plurality of latch registers 24 through 29. Each of the latch registers is comprised of a plurality latch devices whereby a plurality binary bit operand can be gated into the latch devices and stored. To be more fully discussed later, the operand input means also includes a multiplicand source 30, a multiplier source 31, and a multiple decoder latch register 32 which receives successive sets of multipler bits to produce successive selection signals effective to gate selected multiples of the multiplicand into the various latch registers 24 through 29.

The adder tree 21, is comprised of a plurality of carry-save adder units (CSA) arranged in a plurality of carry-save adder stages. The input stage of the adder tree is comprised of a carry-save adder 40 and a carry-save adder 41 designated in the FIGURE 1 as CSA–A and CSA–B respectively. An intermediate stage of the adder tree is comprised of a carry-save adder 42, designated CSA–C and a latch register 43. The final, or output stage of the adder tree, is comprised of a carry-save adder 44 designated CSA–D.

It is the function of the adder tree 21, to receive at its input, groups of signal lines, each group representing all of the bits of the operands stored in the corresponding latch registers 24 through 29. The final output of the adder tree 21, produced by CSA–D are two groups of signal lines which, if combined in a parallel adder, would produce a single group of output signal lines representing the sum of all the operands applied at the input to the adder tree 21.

The adder loop 22 is comprised of a first and second stage of carry-save adders, the first stage of the adder loop being comprised of a carry-save adder 50 designated CSA–E and a latch register 51. The second or final stage of the adder loop 22 is comprised of a carry-save adder 52 designated CSA–F. It is the function of the adder loop 22 to receive successive outputs from the adder tree 21 at the same time as two groups of output signal lines are produced by CSA–F. Four groups of signals lines are applied to the input of the adder loop 22. These include the two groups of output signal lines from CSA–D and the two groups of output signal lines from CSA–F. The rate at which the outputs from CSA–D are produced is equal to the rate at which the adder loop 22 operates whereby successive outputs CSA–F are applied at the input to the ladder loop 22 at the same rate as successive outputs from CSA–D.

The final output of the adder apparatus of FIGURE 1 is a single group of output signal lines from the parallel propagate adder 23 which combines two groups of output signal lines to produce a final sum value. As shown in FIGURE 1, the parallel adder 23 receives inputs either from CSA–F or CSA–D. When the apparatus of FIGURE 1 is to be utilized to produce a final sum value for only one plurality of operands applied to the latch registers 24 through 29, the parallel adder 23 will receive as inputs the outputs of CSA–D to produce a final sum value. However, if the adder apparatus of FIGURE 1 is to be utilized to accumulate the sum of a plurality of operands applied in successive time periods of the latch registers 24 through 29, the adder loop 22 will be rendered effective to accumulate the sums. The output of CSA–F will be applied to the a parallel adder 23 when CSA–F produces two groups of output signal lines which represent the final such value of all the operands applied.

Each of the carry-save adders shown in FIGURE 1 is comprised of a plurality of orders, each order receiving three inputs, one from corresponding bit positions of three of the latch registers 24 through 29. The logic of a carry-save adder order is to receive the binary 1 or binary 0 inputs from three different operands and produce two signals at its output, one representing the sum of the binary 1 is applied and the other representing a carry produced by the three inputs. A binary 1 or significant output signal representing a sum will be produced when a combination of binary 1 inputs is equal to 1 or 3, and a carry signal will be produced when 2 or 3 binary 1 inputs are present. Therefore, CSA–A produces two groups of output signal lines, one representing a sum value for the operands applied from latch registers 24, 25, and 26, and a second group of output signal lines representing the carry produced by the three operand inputs. If the sum signals and the carry signals were combined in a parallel adder, a single output would be produced representing the sum of the three operands applied at the input of the carry-save adder.

The carry-save adders of FIGURE 1 operate essentially the same as the carry-save adders shown in Patent 3,115,574. The number of carry-save adders in any particular stage of the adder tree 21 must be sufficient to accommodate all of the sets of three groups of input signal lines. For example, the first stage of the adder tree 21 includes two carry-save adders to accommodate the six groups of input signal lines. In certain of the adder tree stages, certain groups of output signal lines from a previous adder stage cannot be included in a set of three groups of input signal lines to the particular adder stage. In this case, those groups of signal lines which are not included in a set of three groups of input signal lines are applied to a latch register. In those adder stages which require the use of a latch register, the carry-save adder orders are each comprised of a gated adder latch. The gated adder latch devices are the same as those disclosed in co-pending application Ser. No. 471,021, now Patent No. 3,340,388 issued Sept. 25, 1967, entitled Latch Carry-Save Adder Circuit for Multipliers by John G. Earle, filed July 12, 1965, and assigned to the assignee of this application. Carry-save adder 42, designated CSA–C LATCH is such a carry-save adder comprised of a plurality of latches disclosed in the co-pending application. It is the presence of the gated adder latches and gated latch registers in the various stages of the adder apparatus of FIGURE 1 which permits the application of new pluralities of operands to the latch registers 24 through 29 at a rate faster than the time interval required to produce a sum output based on the input operands. The gated adder latches as disclosed in the above-mentioned co-pending application are operative to be responsive to a gate signal and three input operands to produce an output signal representing the carry-save adder functions. The latching operation is such that the output produced will be maintained even though the gate signal disappears or the input signals change. A new output signal will not be produced until a new gate signal is provided. Therefore, the output of a gated carry-save adder latch will be maintained throughout the interval between the start of succeeding gate signals.

Figure 2:
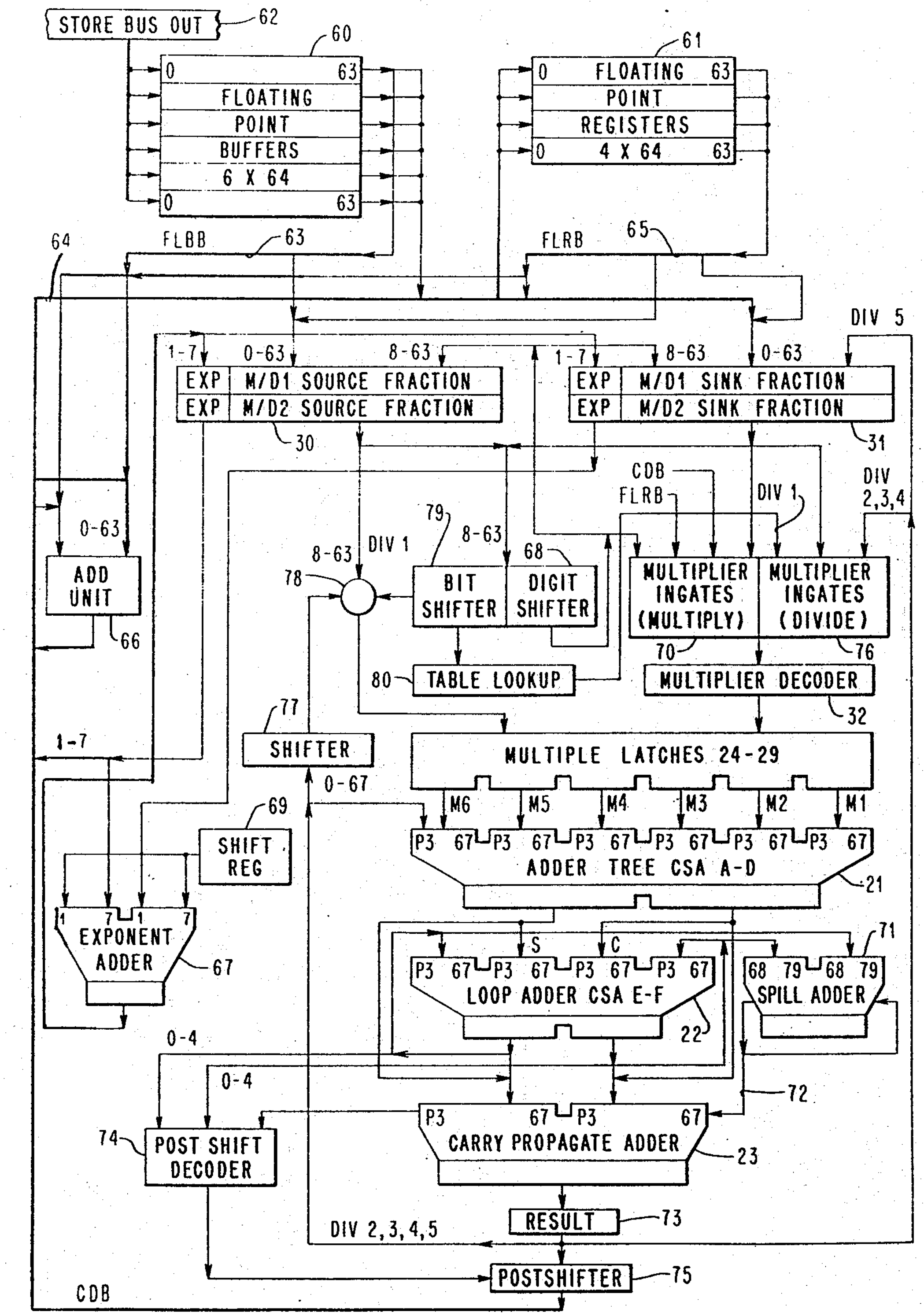
FIGURE 2 is a block diagram representation of the major units of a floating point execution unit of a data processing system which utilizes the adding apparatus of the present invention to perform multiplication or division.

FIGURE 2 shows in block diagram form the environment for the adder apparatus of the present invention. The present invention finds use in a floating point arithmetic unit of a data processing system where it is desired to multiply or divide floating point binary numbers. The floating point numbers to be multiplied or divided consist of 64 binary bits. The highest order or bit 0 position of the floating point number represents the sign of the number. Positions 1–7 represent an exponent value to the base 16 (hexadecimal) and position 8 through 63 represent a fraction portion of the number. The fraction is comprised of 14 hexadecimal digits, each digit comprised of 4 binary bits. The radix point of the number represented is assumed to be between positions 7 and 8 in the binary number. As is well known in floating point multiply or divide, only the fraction portion of the numbers are multiplied or divided while the exponent values are added or subtracted to achieve a final exponent value. It is the purpose of the present invention then to facilitate the multiplication of two binary numbers each comprised of 56 binary bits representing the fraction portion of the number.

Before describing the remainder of FIGURE 2, it will be pointed out at this time the position of the adder apparatus of FIGURE 1 within the entire environment. The block diagrams in FIGURE 2 have been numbered to correspond with the designations used in FIGURE 1. The registers 30 and 31 are shown to be two separate registers in FIGURE 2 whereby the instruction handling unit of the data processing unit will be capable of inserting two multipliers and two multiplicands in the registers 30 and 31 for action by the multiplying apparatus. Each of the registers 30 and 31 will be comprised of 64 data bits of which only positions 8 through 63 will be utilized in the adder apparatus for the purpose of multiplying or dividing the fraction portions. There is also shown in FIGURE 2 the multiplier decoder 32, the latch registers 24 through 29, the adder tree 21, the adder loop 22, and the carry propagate parallel adder 23.

Additional apparatus shown in FIGURE 2 include six floating point buffers 60 and four floating point registers 61, all of which are capable of buffering the 64 binary bits of floating point numbers initially received from a storage bus 62. The data in each of the floating point buffers 60 can be read out either to a floating point buffer bus (FLBB) 63 or can be read out to a common data bus (CDB) 64. The data in the floating point registers 61 can be read out to a floating point register bus (FLRB) 65. The data which is placed on the bus 63 or the bus 65 can be transmitted to an add unit 66 which does not form a part of the present invention. The add unit 66 is shown in the present environment only to suggest that floating point numbers can also be added or subtracted. The output of the add unit 66 can be placed on the common data bus 64. The multiplicand or source fraction register 30 can receive data either from bus 63 or 65. Further, the multiplier or sink fraction in registers 31 can be received from the bus 65 or from the common data bus 64.

As mentioned previously, a necessary function during multiplication or division of floating point numbers is to add or subtract exponent values. For this purpose, there is shown schematically an exponent adder 67 which performs the exponent addition or subtraction, the output of which is transmitted back to the exponent portion of the data in the registers 30 or 31. Another necessary function in most floating point arithmetic devices is a process called normalization. In the present invention, it is assumed that the fractions of the floating point numbers have been normalized. For multiply, the highest order hexadecimal digit of the floating point number must contain a binary 1. In other words, if the floating point numbers as received in the registers 30 or 31 does not have a binary 1 in the highest order digit, the fraction portion of the floating point numbers will be transferred out of the registers 30 or 31 to a digit shifter 68 which will recognize leading zeros in the fraction number and cause the fraction portion of the floating number to be shifted left to produce a binary 1 value in the highest order digit of the fractional number. The number of positions which must be shifted to produce a binary 1 in the highest order digit is noted and recorded in a shift register 69 associated with the exponent adder 67. The output of the shift register 69 will be utilized to modify the result of the exponent addition or subtraction to reflect the number of positions the fraction has been shifted to cause normalization.

Also shown in FIGURE 2 schematically are multiplier ingates 70. To be more fully discussed, it will be shown that five iterations are required to multiply the 56-bit fractional multiplicand by the 56-bit fractional multiplier. On each iteration, 13 bits of the multiplier are examined and utilized to energize the multiplier decoder 32. On iteration 1, the multiplier ingates 70 are capable of transferring the first 13 bits of the multiplier to the decoder 32 from the common data bus 64 (CDB), the floating point register bus 65 (FLRB) or from the digit shifter 68 at the same time the fraction is being inserted in the registers 31. From then on, the multiplier ingate 70 succeeding groups of 13 multiplier bits to the decoder 32. The operation of the multiplier ingate 70 is essentially the same as that disclosed in the above-mentioned issued patent which examines multiplier bits in groups. On each iteration of a multiply operation, the multiplier decoder 32 will produce signals effective at the latches 24 through 29 to gate the multiplicand from registers 30 to the latches shifted by a proper amount to reflect the multiples of the multiplicand dictated by the multiplier bits examined to produce in the latch registers 24 through 29 multiples of the multiplicand designated in FIGURE 2 as M1 through M6. The groups of signal lines labelled M1 through M6 are the multiples of the multiplicand which are presented as inputs to the adder tree 21 to provide an ultimate output representing the product of the multiplicand and the multiplier bits examined.

Each of the carry-save adders in the adder apparatus must be capable of handling input operands having 71 binary bit positions. The positions of the carry-save adder are labelled, from high order end to the low order end, P3, P2, P1, 0, 1 . . . 67. Although the fractional portion of the floating point number has only 56 binary bits, the decoder 32 may require the multiplicands to be shifted 11 positions to the right prior to entry into the adder tree. Likewise, in certain instances the multiples produced in the latches 24 through 29 may be complement members requiring extension of the sign positions to higher orders with the capability of handling carriers from the highest order position of the adders. Thus, the reason for the positions labelled P3, P2, and P1.

An additional apparatus, which will not be further discussed, but which is required to perform multiplication is shown in FIGURE 2 as a spill adder 71. The multiplier ingates 70 gate 13 multiplier bits to the decoder 32 starting at the low order end of the fraction. Thereafter, succeeding 13 bit groups are taken from groups displaced from the preceding groups by 12 multiplier bits which causes the multipliers to be examined in five groups of 12 bits. As with paper and pencil multiplication, succeeding partial products are shifted in relation to previously generated partial products. In the present embodiment of the invention, the succeeding partial products produced at the output of the adder loop 22 are shifted right 12 bit positions before being entered back into the input of the adder loop 22. This has the effect then of shifting previous partial products in relation to succeeding partial products produced by succeeding groups of multiplier bits. The 12 binary bits of the two groups of output signal lines of the adder loop 22 which have been shifted right are applied to parallel spill adder 71 which has the function of determining, at the end of the five iterations, whether or not a carry will have been produced by the addition of the bits shifted to the right. If the bits shifted to the right during the five iterations produce a carry out of the spill adder 71, this carry is applied as an input 72 to the lowest order bit position of the parallel adder 23. As in normal multiplication, if a multiplier of 56 bits and a multiplicand of 56 bits are multiplied, a final product would be produced having 112 binary bits. The number system in the data processing system used only requires the higher order 56 binary bits to produce the ultimate result fraction. The 56 low order bits which have been shifted right, as mentioned previously, enter into spill adder 71 to determine whether or not the highest order 56 bits will be affected by a carry from the lower order 56 bits.

Once a final product has been determined, it is gated from the carry propagate adder 23 to a result register 73. A post shift decorder 74 is utilized during the final product generation in the parallel adder 23 to determine whether or not the highest order 4-bit digit of the final product has a binary 1 therein and therefore represents a mormalized fraction. If the post shift decoder 74 detects that the highest order 4-bit digit does not contain a binary 1, a post shifter 75 is energized to shift the entire product fraction to the left 1 digit, or 4 positions. The output of the post shifter 75 is applied to the common data bus 64 to be transferred to the floating point register 61 as the final result of the multiplication.

The environment of FIGURE 2 which is essentially an apparatus for performing multiplication is also utilized for doing floating point divided operations. The divided operation utilizing the adder apparatus of the present invention is performed by doing multiplication. The divided operation essentially is a matter of determining a reciprocal value for a divisor and thereafter utilizing the reciprocal of the divisor as a multiplier and utilizing the dividend as a multiplicand to obtain a final quotient value. For purposes of division, multiplier ingates 76 are provided for gating information to the multiplier decoder 32 during divided operations. Likewise, the divide operation requires a number of iterations wherein the output of adder tree 21 is applied directly to the parallel adder 23 and the result of this output is gated back through a shifter 77 for the purpose of entering a multiplicand into the latches 24 through 29. The shifter 77 output is applied to a schematically represented OR circuit 78. OR circuit 78 is effective to gate to the latches 24 through 29 a multiplicand used during divison, or a multiplicand from the registers 30, or a multiplicand from a bit shifter 79. In divide operations, it is not enough that the highest order 4-digit group of the divisor has a binary 1. Rather, the highest order bit position of the divisor must contain a binary 1. Bit shifter 79 is capable of shifting the fraction number to ensure that a binary 1 is contained in the highest order bit position of the fraction. Another block shown in FIGURE 2 is a table look-up apparatus 80 which is utilized during the first iteration in a divide operation for producing an approximate reciprocal of the original floating point divisor, the output of which is gated to the multiplier ingate 76 to the multiplier decorder 32 to be utilized as a multiplier.

Figure 3:
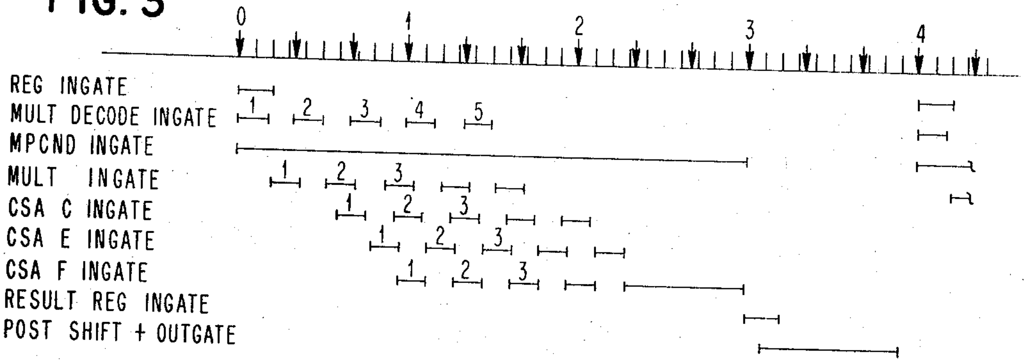
FIGURE 3 is a timing diagram showing the various gating pulses utilized to cause the adder apparatus of FIGURE 1 to produce a final product in the mulitiplcation of two binary numbers.

FIGURE 3 is a timing diagram showing the timing relationship between the various timing pulses or gating pulses utilized in the adder arrangement of FIGURE 1. During iteration #1, representing the start of the multiply operation, the multiplier will have been gated through the shifer for normalization and a gate labelled Register Ingate will be utilized to gate the normalized multiplier back into the multiplier register 31. At the same time, a gate (MPCND INGATE) will be enabled whereby the 56-bit multiplicand in the register 30 will be gated to the latch registers 24 through 29. The multiplier decode ingate for interation 1 is produced whereby the lowest order group of multiplier bits will be ingated to the multiplier decoder 32 latches to be retained therein. After a suitable delay, permitting the multiplier decoder 32 to operate, the multiple ingate (MULT INGATE) will be produced whereby proper multiples of the multiplicand will be entered into the appropriate latch registers 24 through 29. The latched data in the latched registers 24 through 29 is then immediately applied to the input of the adder tree comprised of CSA–A and CSA–B. After a suitable delay permitting the logic in the first stage of the adder tree to perform the summing operation, CSA–C INGATE will be produced whereby the result of the opeartion of CSA–A and CSA–B will be ingated to CSA–C and latch register 43. The sum (s) and carry (c) signals produced by CSA–C will be latched and retained and the outputs therefrom applied to the logic of CSA–D to produce the 2 groups of output signal lines from the adder tree 21 representing sums and carries for the original operands applied for interation 1. After a suitable delay, representing the length of time it takes to ingate to CSA–C and lach 43 to the time that CSA–D has produced a result, an ingate is applied to carry-save adder 50 and latch register 51 (CSA–E INGATE) whereby CSA–E performs the summing logic and latches the result for application to the input of carry-save adder 52 (CSA–F). After the resolution of the sums in CSA–E, an ingate is produced at carry-save adder 52 (CSA–F INGATE).

As can be seen from FIGURE 3, at the time of the entry of the multiplicand multiplies into the latch registers 24 through 29 by means of the multiple ingate, the inputs to the multiplier decode can be entered for iteration 2 shortly before the end of the multiple ingate for iteration 1. In a like manner, at the time of the ingating to CSA–C based on the applied operands for iteration 1, the latch registers 24 through 29 can be modified for iteration 2. As a feature of the present invention, various latch points are provided and include the multiplier decoder 32, the latch registers 24 through 29, carry-save adder 42 and latch 43, carry-save adder 50 and latch 51, and carry-save adder 52. As a result of the various latch points, the ingate of operands to a particular latch point can be changed when a succeeding latch point has received the results generated by a previous set of operands at the particular latch point. As shown in FIGURE 3, four sets of multiplier bits have been presented to the multiplier decoder 32 before the first partial product has been produced by carry-save adder 52 (CSA-F). In the prior art as represented by Patent 3,115,574, the second set of multiplier bits could not have been presented to the multiple generators until the first partial product based on the first multiplier decode had been produced.

As is readily apparent from the remainder of the representation of ingates in FIGURE 3, the five groups of multiplier bits to be decoded to perform multiplication of a 56-bit number have been examined an decoded essentially at the same time that the second partial product has been generated from the application of the second set of multiplier bits. The numbers (0–4) at the top of FIGURE 3 represent data processing machine cycles and show that the entire multiplication of two 56-bit binary numbers can be performed utilizing the adder apparatus of the present invention within 4 machine cycles. As will be shown subsequently, the timing means by which the multiply can be performed is a simple apparatus merely requiring the generation of five iteration ingates to the multiplier decode ingate with sequential stages of delay for utilizing the same pulse, as the ingate to succeeding latch stages.

Figure 4:
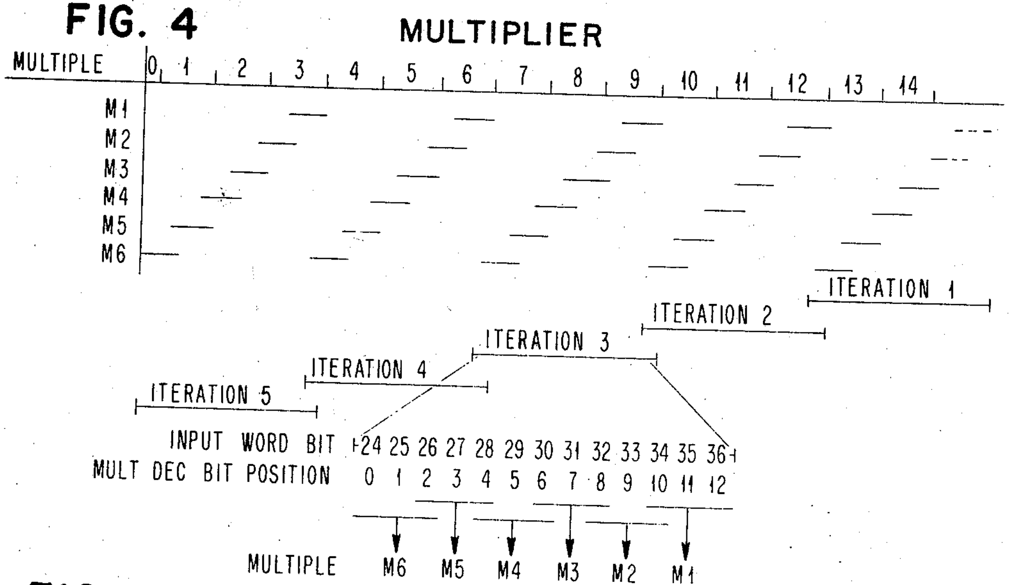
FIGURE 4 is a representation of the groups of multiplier bits simultaneously examined in five succeeding iterations to cause multiples of the multiplicand to be applied as inputs to the adder apparatus of FIGURE 1.

FIGURE 4 is a representation of a 56-bit multiplier showing the manner in which the multiplier bits are examined in groups of 13, with succeeding groups overlapping by 1 binary bit. The last iteration, or iteration 5, uses position 8 of the floating point number and utilizes an assumed binary 0 for the highest order position of the multiplier. Starting at the left of the multiplier, and proceeding in groups of 13 binary bits, with each succeeding group overlapping by 1 binary bit, the final group of multiplier bits to be examined during iteration 1 assumes binary 0's for generating multiple M1 and uses a single binary bit of the multiplier for generating multiple M2. The numbers 1–14 represent the 14 hexadecimal digits of the multiplier.

It should be remembered that the fractional portion of the floating point number is in fact a fraction such that multiplication of a fraction by another fraction produces a smaller fraction. In a like manner, if a multiplicand were to be multiplied by the lowest order, or right hand binary bit of the multiplier, the multiplicand would be shifted to the right in effect causing a division of the multiplicand by $2^{56}$. However, as mentioned previously, partial products generated at the output of the adder loop are shifted right 12 bit positions corresponding to 12 bits of the multiplier utilized on each iteration such that the product formed by the multiplier is properly factored to account for the multiplication of one fraction by another fraction.

FIGURE 4 depicts the actual multiplier bits examined during iteration 3. During iteration 3, the multiplier bits 24 through 36 will be gated to the multiplier decoder 32. The multiples M1 through M6 of the multiplicand applied to latch registers 24 through 29 respectively are produced by examining 3 multiplier bits, with the highest order multiplier bit in one particular group being in common with the lowest order multiplier bit in a next succeeding higher order group of multiplier bits.

Figure 5:
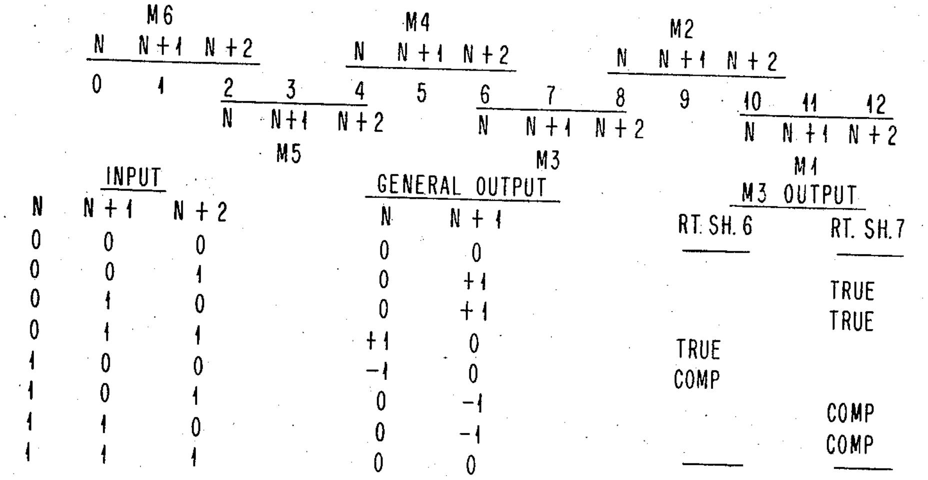
FIGURE 5 is a table representing the decoding of a group of multiplier bits to produce output signals representing multiples of the multiplicand to be applied to the adder apparatus.

FIGURE 5 indicates how the 13 multiplier bits are decoded on each iteration. The numbers 0 through 12 represent the 13 multiplier bits examined on each iteration. Multiple M1 is shown to be a function of multiplier bits 10, 11, and 12 for each iteration, and in accordance with FIGURE 4 for iteration 3, these are actually multiplier bits 34, 35, and 36. The six groups of multiplier bits examined on each iteration are shown in FIGURE 5. In the lower portion of FIGURE 5 there is shown the general inputs to each of the multiple decoders M1 through M6. These inputs are N,N+1,N+2. The input to the decoder is shown to be capable of assuming 8 permutations. The highest order bit of the group (N) overlaps with the lowest order bit of the next succeeding higher order group (N+2). Well known algorisms can be utilized for determining the proper amount of shift to be applied to the multiplicand for entry into any particular latch register to represent a multiple of the multiplicand. At least one algorism utilizes the three multiplier bits in a particular group to produce a 2 output signal as indicated in FIGURE 5 and labelled GENERAL OUTPUT. The values N, and N+1 under the general output represent the positional value of the multiplier bit in the group of 13 multiplier bits. The designation 0, +1 or −1 in a particular column designates what must be accomplished in the gating of the multiplicand to the particular latch register. In other words, if N and N+1 are both 0, 0's are gated to the latch register. A column designation of +1 indicates that the multiplicand is to be shifted N+1, or N positions to the right in true form to the latch register. A designation of −1 indicates that the multiplicand is to be shifted right N positions or N+1 positions in complement form.

The 2 output signals of the multiplier decoder 32 for the gating of the multiplicand into latch register 26 which receives multiple M3 is shown in FIGURE 5. The value N, and *N*+1 in this case are the binary values in position 6 and 7 respectively of the group of multiplier bits being examined. It can be seen, therefore, that based on the binary permutations of the binary bit positions 6, 7 and 8 in the decoder 32, a multiplicand will be entered into the latch register 26 shifted right 6 or shifted right 7, either in true or complement form, to thereby properly reflect the result of multiplying the multiplicand with multiplier bits 30, 31, and 32. As can be seen in connection with multiple M1, the multiplicand may be shifted into the latch register 24 up to 11 positions dictating the need for extending the number of adder positions 11 positions more than the normal 56 bit size of the multiplicand.

In connection with multiple M3 in iteration 3, it can be seen that the multiplicand should be multiplied times $2^{-30}$ or $2^{-31}$ in accordance with the rules for multiplying one fraction by another fraction. Although the decoder output for multiple M3 only causes a shift of the multiplicand by either 6 or 7 positions to the right, the ultimate output of the partial product produced by the operands presented in iteration 3 is shifted right a total of 24 bit positions during iterations 4 and 5 at the output of the adder loop 22. Therefore, the partial product generated by the operands from iteration 3 will be properly factored to reflect a multiplication by $2^{-30}$ or $2^{-31}$.

Figure 6:
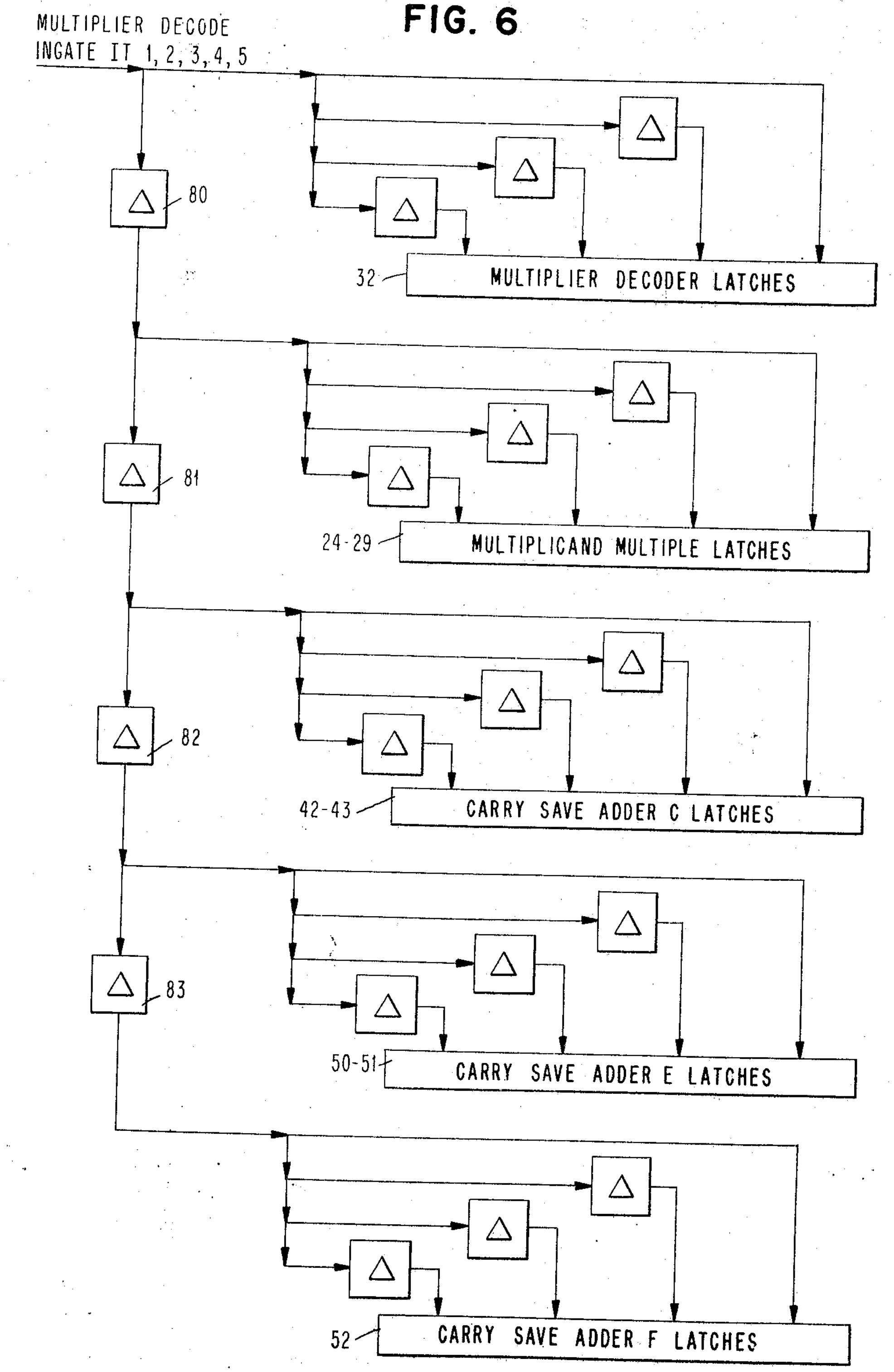
FIGURE 6 is a schematic representation of the timing means in the present invention which causes intermediate results in the adder apparatus to be entered into succeeding latch devices permitting the simultaneous generation of succeeding partial products in a multiply operation.

The easily implemented timing means to perform multiplication is shown in FIGURE 6. The various gated latch devices are shown in FIGURE 6 and include the multiplier decoder latches 32, the multiplicand multiple latch registers 24 through 29, the carry-save adder latches 42 and latch register 43, the carry-save adder latches 50 and latch register 51, and the carry-save adder latches 52. Each multiplier decode ingate shown in FIGURE 3 is not only utilized to ingate the proper multiplier bits to the decoder 32 but it is also applied to a series of delay devices 80 through 83 to produce, sequentially, the proper ingates in response to each multiplier decode ingate. As another feature of the implementation of the preferred embodiment of this invention, the logic design of the adder apparatus is such that several logic component mounting boards were required to produce each of the stages of latch devices. Since data processing machines are operating at increasingly faster rates of speed, the propagation of pulses along lengths of wire become a factor. Therefore, to insure that the ingate signals to a particular set of latches arrive at all of the latch devices at the same time, various amounts of delay are also applied to each of the ingate signals of the particular set of latches to reduce the skew or out-of-synchronism effect, produced by the delays along lengths of wires.

Further, in implementing the preferred embodiment of the present invention, it was discovered that by planned circuit and logic design, the delay caused by logic levels plus lengths of wire between logic levels could be made essentially equal from one latch input to the next latch input. For example, in a preferred embodiment of the invention as implemented, there are either four logic levels between succeeding latch inputs or three logic levels and a length of wire producing a propagation delay essentially equal to one logic level. In addition, it is found that the logic required to implement the adder loop 22 of FIGURE 1 produces the same amount of delay.

By reason of the various succeeding stages of gated latch devices or gated adder latches, and the substantially equal signal delays between inputs to the succeeding gated latch devices, the rate at which pluralities of operands can be presented at the input to the adder apparatus can be at a rate substantially equal to the logic and circuit delays between gated latch device inputs. This permits the pipe-line effect of the adder apparatus of FIGURE 1 wherein the latching of outputs produced by a particular gated latch can be utilized in succeeding stages simultaneously with the ingating of a new series of inputs at a preceding stage.

Figure 7:
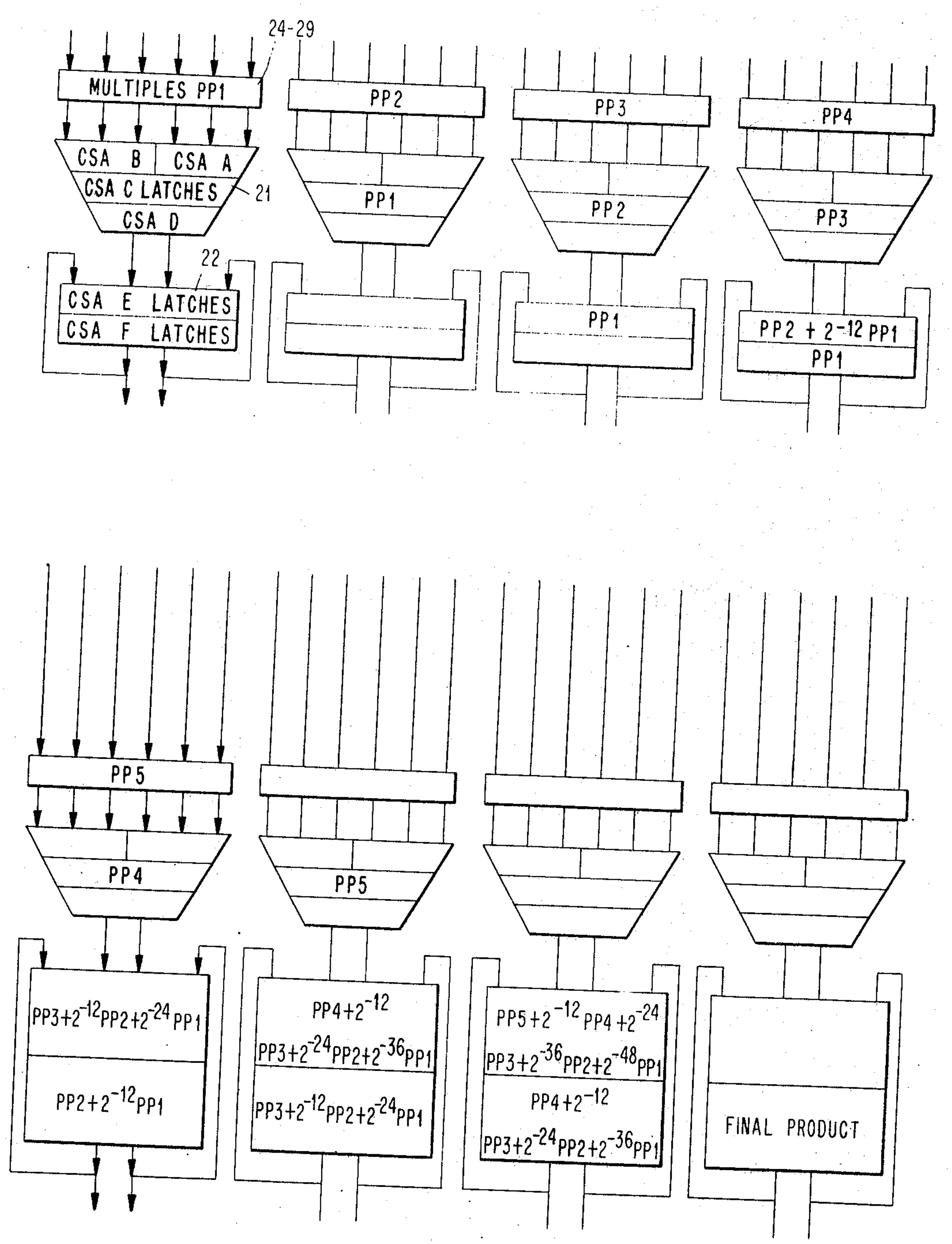
FIGURE 7 is a schematic representation of the manner in which the adding apparatus of FIGURE 1 produces succeeding sums of partial products based on the successive application of a plurality of multiplicand multiplies produced as a result of decoding successive groups of multiplier bits to ultimately produce a final product.

The manner in which the pipe-line effect is utilized is depicted in the schematic representation of FIGURE 7. In the upper left-hand representation there is shown the latch registers 24 through 29, the adder tree 21 and the adder loop 22. There is also shown the first set of six operands being applied to the latch registers 24 through 29 which will be utilized to generate a partial product for iteration 1 (PP1). In the next drawing, an ingate of PP1 has been made to CSA–C and latch register 43 at the same time a succeeding plurality of operands has been entered into the latch registers 24 through 29 which will ultimately produce a sum representing a partial product for iteration 2 (PP2). At the time of entry of PP1 into the CSA–E latches a third plurality of operands have been applied to the latch registers 24 through 29. At the time of entry of the six operands into the latch registers 24 through 29 for iteration 4 (PP4). PP1 has been ingated to CSA–F to produce an output therefrom gated back to the input of CSA–E. At the moment of ingating PP2 to CSA–E latches, the binary bits representing PP1, shifted right 12 positions is also ingated to CSA–E.

The successive gating of a plurality of operands to the latch registers proceeds simultaneously with the successive gating of intermediate results from one set of gated latches to the next set of gated latches along with the shifting of the output of the adder loop right 12 positions to the input to the adder loop until a final product representation is ingated to CSA–F. At this time, the two groups of output signal lines from carry-save adder 52 (CSA–F) are applied to the parallel propagate adder 23 to produce a final product result.

FIGURES 8 through 11 with reference to FIGURES 1 and 2 will be utilized to explain the manner in which the high-speed multiply apparatus utilizing the added tree and added loop performs division by use of reciprocals.

Figure 8:
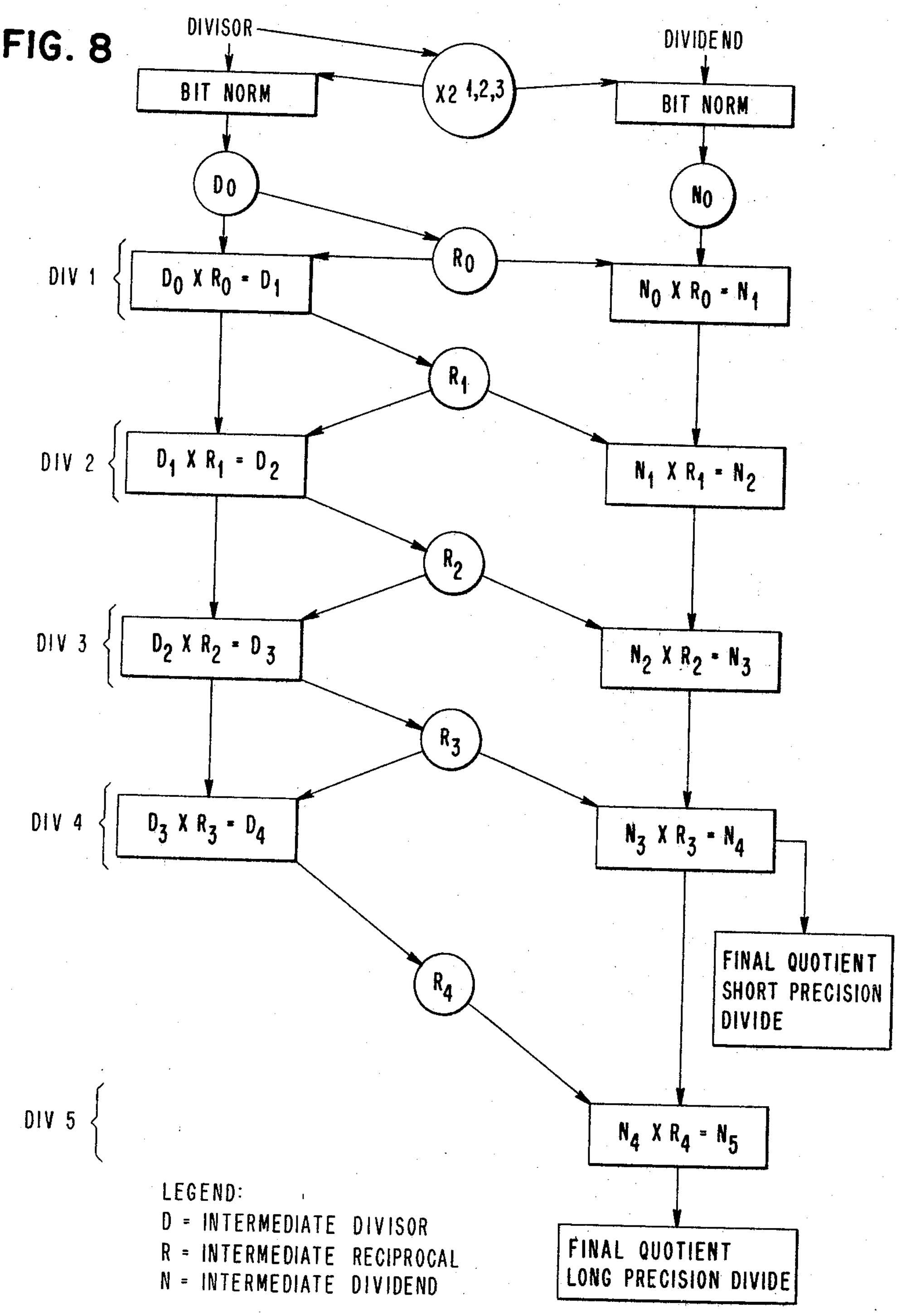
FIGURE 8 is a flow chart diagram of the manner of performing division in accordance with the present invention.

FIGURE 8 is a flow diagram showing the essential steps to perform division utilizing approximate reciprocals.

Before the first iteration of divide execution begins, the divisor and dividend, which have been digit-normalized before the operation is begun, that is a binary 1 in any one of the highest four order bit positions, are aligned in the bit shifter 79 of FIGURE 2. The divisor is bit-normalized when a binary 1 is contained in the highest order bit position of the divisor. The number of left shifts ($X2^{1,2,3}$) required to bit normalize the divisor is utilized to shift the dividend the same number of positions to the left in the bit shifter 79. This will maintain the proper relationship of the divisor and the dividend hexadecimal digits with the hexadecimal notation utilized for the exponent value in the floating point number. When the dividend is shifted left a number of positions equal to the divisor shift, a binary 1 may be shifted out of the highest order position of the dividend. If such occurs, the bit shifter 79 has a set of gates which causes the dividend to be right shifted 4 bit positions, or 1 hexadecimal digit, and the exponent of the result previously computed is increased by 1. The output of the bit shifter in each case is a starting divisor ($D_0$) and a starting dividend ($N_0$).

The bit-normalized divisor $D_0$ is transferred to a table lookup device 80 (FIGURE 2) which transfers 13 bits representing the approximate reciprocal of the divisor ($R_0$) to the multiplier decoder 32 through the multiplier ingates 76 used for divide. As shown in FIGURE 8, the first reciprocal $R_0$ is utilized in a first divide iteration (DIV 1) to multiply $D_0$ and $R_0$ and then to multiply the original dividend $N_0$ and $R_0$. The intermediate divisor $D_1$ is manipulated to produce another intermediate approximate reciprocal $R_1$, 13 bits of which are transferred through ingate 76 to the multiplier decoder 32. The new reciprocal $R_1$ is then used for multiplication with the $D_1$ and $N_1$ in divide iteration 2 (DIV 2) which produces another intermediate divisior $D_2$. The multiplication of the approximate reciprocals times intermediate divisors and intermediate numerators proceeds until $N_4$ is produced which is the final quotient whenever short precision floating point fractions are utilized. When long precision floating point numbers are utilized, reciprocal $R_4$ is generated and transferred to register 31 of FIGURES 1 and 2 for use during a fifth divide iteration. Three successive groups of 13 multiplier bits are transferred to the multiplier decoder 32 in the same manner as during multiply previously described. At the end of the third multiply cycle during divide iteration 5 (DIV 5), the final product output of the parallel adder 23 represents the quotient of the original long precision dividend and divisor.

It will be noted in FIGURE 8 that operations at the left of the drawing occur concurrently with operations on the right using the same apparatus. The development of operands on the left of the drawing proceed without resort to operands developed on the right of the drawing. This distinguishes from prior art divide apparatus where divisor multiples used during particular iterations are dependent based on the results of operations on a previous dividend-remainder such that each operation cannot proceed until the previous has been terminated.

Figure 9:
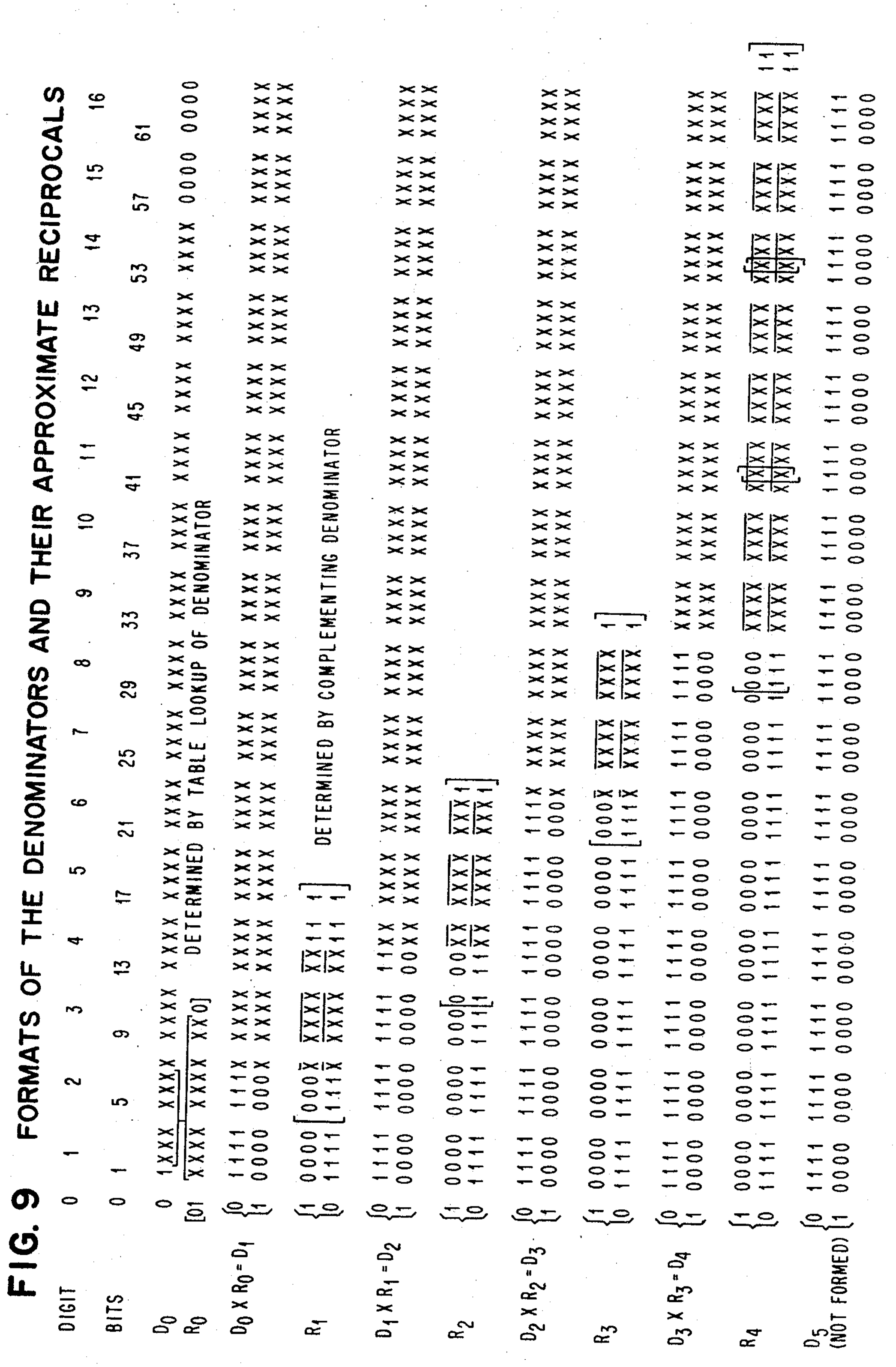
FIGURE 9 is a table diagram showing the format of divisors and their reciprocals utilized in the present invention.

FIGURE 9 presents the formats of the divisor and its approximate reciprocals which are formed in the division process. On each divide iteration the approximate reciprocal $R_N$ of the current intermediate divisor $D_N$ multiplies the intermediate divisor $D_N$ and dividend $N_N$ to form, respectively, a new intermediate divisor and dividend. A new approximate reciprocal is then determined by complementing a high-order portion of the new intermediate divisor. Note that successive divisors converge towards 1. This implies that the reciprocal is converging towards the reciprocal of the initial divisor. Therefore, successive intermediate dividends are converging towards the quotient. With the execption of the initial divisor and reciprocal ($D_0$) and ($R_0$), the operands of FIGURE 9 have two possible formats. Those portions of the reciprocals sent to the multiplier decoder 32 are bracketed. Since for $R_0$, $R_1$, $R_2$, and $R_3$, only one group of 13 bits is decoded, these operands can multiply a divisor or dividend by means of a single pass through the carry-save adder tree. For these one-pass multiply cycles, the adder loop 22 is circumvented in order to reduce execution time. In other words, the two groups of output signal lines of the adder tree are transferred directly to the input of the parallel adder 23.

The initial approximate reciprocal $R_0$ is determined by a combinatorial table look-up of positions 2 through 7 of the initial divisor in the table look-up device 80 of FIGURE 2. The product $D_0 \times R_0 = D_1$ is guaranteed to have the format shown in FIGURE 9. This method of forming the initial approximate reciprocal gives a rapid start to the convergence process. All succeeding approximate reciprocals are determined by complementing a high-order section $D_N$ as it passes from the parallel adder 23 to the multiplier decoder 32.

From theoretical considerations, an intermediate reciprocal $R_N$ should have a value equal to 2—the high order position of $D_N$ used to determine the reciprocal. That portion of $D_N$ used to determine $R_N$ is equal to $(1+X_N)$, X being equal to the fractional value of the bits directly to the right of the decimal point used in the reciprocal value determination. Then the corresponding $R_N$ should be equal to $(1-X_N)$. The minimum leading string length (1's or 0's) developed for the next intermediate divisor $D_{(N+1)}$ is equal to the number of high-order positions of $D_N$ which are used to determine $R_N$. The number of leading 1's or 0's for $D_{(N+1)}$ will never be more than double the number of 1's or 0's for $D_N$ when $R_N$ is determined by this method. The number of leading 1's or 0's for $D_2$ or $D_3$ may be greater than the number assumed. However, more hardware would be required to detect this. Therefore, the formats shown for $R_2$ and $R_3$ have been chosen to permit the one-pass multiply and less than the maximum convergence of the divisor towards 1 is realized. It will also be noted from FIGURE 9 that the total number of unknown bits (X) used as multipliers is equal to the number of bits in the fractional number.

Reference should be made to FIGURE 5 which shows a multiplier decoder rule for an explanation of how $D_N$ or $N_N$ is multiplied by $R_N = (1-X_N)$. When a 3-bit group is decoded as being all 1's or all 0's, the decoder produces a 0 output. Thus, the leading strings of 1's or 0's of a divisor or reciprocal may be skipped over, and need not be gated to the multiply decoder. If the input of the multiplier decoder 32 is logically complemented, the sign of the decoder output is changed while the magnitude remains unchanged. This property can be used to produce $-X_N$ at the decoder output.

Figure 11:
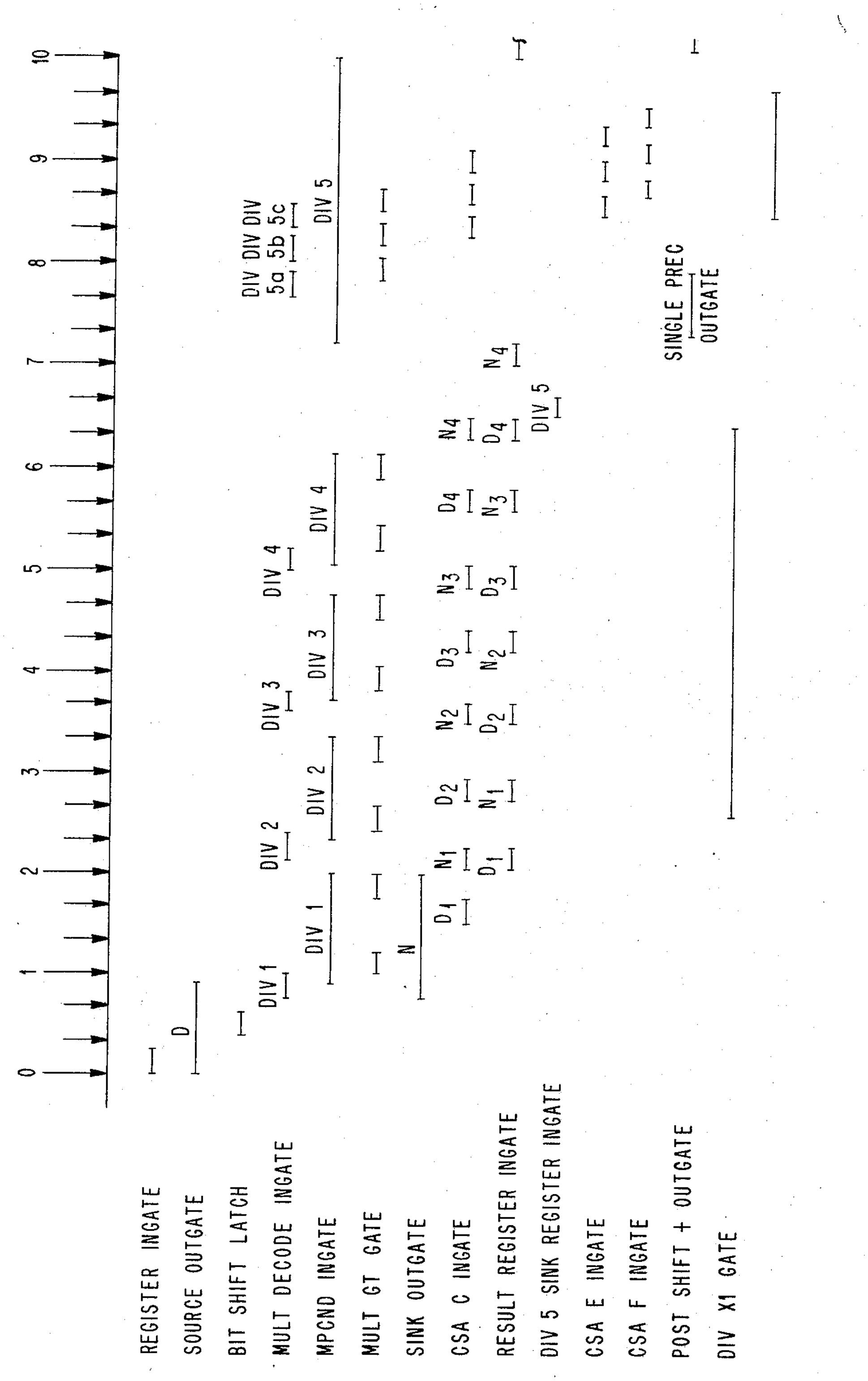
FIGURE 11 is a timing diagram showing various gating signals required at various gated latch devices to permit concurrent multiply operations to proceed during divide operations.

In divide iteration 1, the multiplier $R_0$ comes from the table look-up device 80 while the multiplicand ($N_0$ or $D_0$) arrives from the bit shifter 79 with the alignment shown in FIGURE 11. There is no high-order string of 1's or 0's skipped over in $R_0$ and all six multiplier decoder 32 outputs may be other than 0.

To explain iterations 2, 3, and 4, divide iteration 3 will be used as an example. If all bit positions of $R_2$ were used as a multiplier and decoded, a bit value 1.0 would be decoded from the highest order bit examined and a set of bits of value −0.00 . . . XX would be decoded from the portion to the right of the decimal point. Only the bracketed portion of $R_2$ is gated to the decoder 32 however. The multiplier decoder 32 output will have a value $-2^{12} \times 2$. The multiplicand (result of previous iteration $D_2$ or $N_2$), available at the output of the parallel adder 23, is right shifted 12 to compensate for the $2^{12}$ factor in the multiplier decoder 32 output. (FIGURE 10 can be utilized to see the amount of shift applied to the multiplicand and multiplier on each of the divide iterations.) The bracketed bits of a reciprocal sent to the multiplier decoder 32 are chosen such that the left hand 3 bits are always identical. Thus multiple M6 applied to latch register 29 will not be used since a zero multiple will be decoded. The product $-D_2X_2$ or $-N_2X_2$ is represented by the 5 operands (M1–M5) gated to latch registers 24 through 28. The unshifted multiplicand is gated simultaneously into the otherwise unused input for multiple M6 via a line 100 shown on FIGURE 2. This then provides the value $1XD_2$ or $1XN_2$. The sum of the operands gated to the six latch registers 24 through 29 is then $$D_2 + (-D_2X_2) = D_2(1-X_2) = D_3$$

or $$N_2(1-X_2) = N_3$$

whichever the case may be.

In divide iteration 5, $R_4$ is transferred to register 31 of FIGURE 1 or 2 and three multiplier decode cycles are initiated to complete the multiplication. The adder loop 22 is utilized in the same way as for previously described multiply instructions. In divide cycle 5*c*, multiple M6 is always zero and the alternate input for multiple M6 from the parallel adder 23 is used to form $1XN_4$. $D_5$ is not formed since quotient $N_5$ is determined independent of this operation.

The division process is completed when the number of bits of convergence of $D_N$ towards 1 (leading 1's or 0's) is at least equal to the number of positions in the original fraction. The short precision divide result is thus available after the fourth divide iteration and the long precision divide result is available after the fifth divide iteration.

The timing diagram in FIGURE 11 can be referred to further depict the divide operation of the present invention. In the divide operation, an oscillator separate from the one utilized for generating the five multiply cycles is used to produce the timing pulses shown in FIGURE 11. An oscillator-driven ring sequences the multiplicand gates (MPCND INGATE) and selects the multiplier decoder ingates (MULT DECODE INGATE). The actual ingating of the multiplier decoder is accomplished by delayed pulses from the divide oscillator.

At time zero, the divisor is gated (SOURCE OUTGATE) to the bit shifter where it is bit normalized (BIT SHIFT LATCH). The bit shifter output ($D_0$) is gated to the multiplicand or circuit 78 of FIGURE 2 where it becomes the first multiplicand (MPCND INGATE). The high order bits of $D_0$ are sent to the table look-up device 80 where the first approximate reciprocal $R_0$ is determined and gated to the multiplier decoder register 32.

At time one, the six-operand multiples representing the multiplication of the original divisor $D_0$ by the first approximate reciprocal $R_0$ is stored in the latch registers 24 through 29 (MULT GT GATE). While the number of operands comprising $D_1(R_0D_0)$ is being reduced in the adder tree 21, the bit shift of the original dividend ($N_0$) is taking place (SINK OUTGATE). Shortly after the four operand representations of $D_1$ is latched at the intermediate stage CSA–C of the adder tree (CSA–C INGATE), the six operands representing the product of $N_0R_0 = N_1$ is gated to the latch registers 24 through 29.

From this point in the process, three latch points are used: CSA–C; result register 73 (RESULT REGISTER INGATE); and the multiplier decoder 32. Intermediate divisors always lead intermediate dividends in traversing the loop from the result register 73, through the OR circuit 78, to the latch registers 24 through 29, through the adder tree 21 and parallel adder 23 back to the result register 73. The four operand representation of $D_N$ or $N_N$ which is latched at CSA–C is reduced to two operands at the output of CSA–D, and bypasses the adder loop 22 to enter the parallel adder 23 directly.

The single group of signal lines at the output of the parallel adder 23 representing the product is stored in the result register 73 at the same time that the four operand representation of the succeeding multiply cycle is stored in CSA–C. The product $D_N$ is transferred from the result register 73 to the multiplicand gates through the shifter 77 and through the multiplier ingate 76 to the multiplier decoder 32. During transfer of $D_N$ to the decoder 32, a portion of it is complemented to provide the previously mentioned value $-X_N$. The contents of the decoder 32 then represents the approximate reciprocal $R_N$ which will multiply both $D_N$ and then $N_N$ to provide $D_{(N+1)}$ and $N_{(N+1)}$.

As can be seen in FIGURE 11, two types of pulse trains are used. The value of $R_N$ stored in the multiplier decoder register 32 is changed once each divide iteration 1, 2, 3, and 4 as is the shift amount in the shifter 77. Since two multiply cycles are performed each iteration, the gates at CSA–C and the result register 73 are pulsed twice per divide iteration.

The period of one divide iteration is equal to the worst-case path from the result register 73 back to the result register via either the multiplier decoder 32 or the latch register 24 through 29. The CSA–C latches and the result register 73, which divide the loop approximately in half, are ingated at the same time.

The first four divide iterations are executed between 1-time and 7-time representing 7 basic machine cycles. In short precision divide, the post shift amount is determined for $N_4$ while it is being formed in the parallel adder 23. If the common data bus (CDB) 64 is free, the digit-normalized short precision quotient $N_4$ is gated out at 7-time.

In long precision divide, an additional multiply of $N_4R_4$ must be performed. This operation is executed identically to the last three multiply cycles of a multiply operation. The sink register or multiplier register 31 is loaded with the complement of a portion of $D_4$ (see FIGURES 9 and 10), and the multiply timing source is started with the ring preset to the beginning of cycle 3 of multiply. The multiplicand $N_4$ is stored in the result register 73 during this operation and the alternate path 100 for the multiple M6 is utilized only on the last pass of the multiply (iteration 5*c*). The successive partial products are accumulated in the adder loop 22 as for normal multiply operations and the result $N_5$ is formed in the parallel adder 23 and gated to the common data bus CDB at 10-time.

While the invention has been particularly shown and described with reference to a preferred embodiment thereof, it will be understood by those skilled in the art that various changes in form and details may be made therein without departing from the spirit and scope of the invention.

What is claimed is:

1. Multiply-divide apparatus including in combination:

(A) adder means including:

(1) a plurality of groups of input signal lines for simultaneously receiving a predetermined number of plural-bit operands to be added, (2) a plurality of operand combining stages connected to said groups of input signal lines to reduce the number of operands required to express the sum of the received operands until a single group of operand signal lines expresses said sum, (a) at least one intermediate one of said stages being comprised of gated latch devices to temporarily store the operands received thereby;

(3) result register means connected to said single group of signal lines for registering the sum of said input operands;

(B) product forming means including:

(1) a plurality of plural-bit multiple registers, each connected to a corresponding one of said groups of adder input signal lines, (2) a plural bit multiplier register for storing a multiplier, (3) a plural bit multiplicand source connected to said multiple registers, (4) decoder means connected to said multiplier register for examining the contents of said multiplier register and effective to enter predetermined multiples of said multiplicand into said multiple registers to thereby represent the product of the multiplicand and multiplier as a plurality of operands to be added in said adder means;

(C) multiplier and multiplicand entry means including:

(1) multiplier transfer means connected to said decoder, (2) multiplicand transfer means connected to said multiplicand source, and (D) sequencing means including:

(1) gating means connected to the input of said decoder, said multiple registers, said intermediate adder stage, and said result register for gating new inputs to each of said devices at a predetermined rate such that the interval between each new set of inputs is substantially equal to the time required for said adder means to reduce the operands at the input of said intermediate stage to said single group of signal lines, thereby permitting independent and concurrent product forming operations to take place in said product forming means and said adder means.

2. Apparatus in accordance with claim 1 wherein: said sequencing means (D) further includes:

(2) means connected to said multiplicand transfer means and said multiple registers for presenting a new multiplicand to said product forming means at said predetermined rate and, (3) means connected to said multiplier transfer means and said decoder for presenting a new multiplier to said product forming means at one-half said predetermined rate.

3. Apparatus in accordance with claim 2 wherein: said multiplicand transfer means (C)(2) includes:

(a) first and second gating means operative during a first iteration of a divide operation to present, respectively and sequentially to said product forming means at said predetermined rate, a bit-normalized divisor and a digit-normalized dividend, (b) third gating means, including means connected between the output of said result register and said multiplicand source responsive to said multiplicand sequencing means, operative during divide iterations subsequent to the first, for presenting to said product forming means sequentially, intermediate divisors and dividends, and said multiplier transfer means (C)(1) includes:

(a) first gating means operative, during a first iteration of a divide operation, to present to said product forming means an approximate recipricol value of a bit-normalized divisor, (b) second gating means, including means connected between the output of said result register and said decoder, responsive to said multiplier sequencing means, operative during divide iterations subsequent to the first, for presenting to said product forming means approximate reciprocals of intermediate divisors, whereby each sequential divide iteration causes intermedite divisors to approach a value of one and intermediate dividends to approach a value equal to the quotient of the divide operation.

4. Apparatus in accordance with claim 3 wherein: said multiplier transfer means (C)(1) further includes:

(c) reciprocal generating means connected between said second gating means and said decoder, including means for shifting the itermediate divisors a predetermined number of bits to the left, and means for complementing the bits entered into said multiplier register, and said multiplicand transfer means (C)(2) further includes:

(d) shifting means, connected between said third gating means and said multiplicand source for shifting the intermediate divisors and dividends said predetermined number of bits to the right.

5. Apparatus in accordance with claim 3 further including:

(E) multiply control means, including:

(1) means to transfer and store the complement of predetermined low order bits of a predetermined intermediate divisor, (2) means to store the intermediate dividend following said predetermined intermediate divisor, and said sequencing means (D) further includes:

(2) further gating means for presenting said stored intermediate dividend to said multiplicand source and a predetermined number of successive higher order groups of bits of said stored reciprocal to said decoder to thereby form a final product representing the quotient of the divide operation.

6. Dividing apparatus for dividing a normalized dividend by a normalized divisor, said dividend and divisor being represented by fractional binary numbers, including in combination:

a multiplier decoder including a plural-bit multiplier register and input shifting means, a multiplicand input means including shifting means, a multiplicand multiple generator for generating a plurality of multiples to be added representing the product of the multiplication of a multiplicand by multiplier bits in said multiplier register, an adder tree connected to said multiple generator for producing two groups of output signal lines which represent the sum of the applied multiples, said adder tree having an intermediate latched adder stage which temporarily stores intermediate result signals for application to a final adder tree output stage, a parallel adder, connected to said adder tree output lines for producing a group of output signal lines manifesting the product of the multiplicand and the multiplier bits, multiplier connecting means between said parallel adder output and the input to said multiplier decoder register, including means to complement said parallel adder output, multiplicand connecting means between said parallel adder output and the input to said multiplicand input means, table look-up means, responsive to a predetermined number of high-order bits of the divisor for generating and transferring to said multiplier decoder register a plurality of binary bits which approximate the reciprocal of the divisor, dipide sequencing means including first gating means for transferring the predetermined number of divisor high-order bits to said table look-up device, second gating means for transferring the divisor to said multiplicand input means to initiate a first divisor multiply cycle, third gating means operative when said intermediate result latch of said adder tree contains results of said first divisor multiply cycle to gate the dividend to said multiplicand input means to initiate a first dividend multiply cycle, fourth and fifth gating means operative when said intermediate result latch of said adder tree contains results of said first dividend multiply cycle to render said multiplier and said multiplicand connecting means effective to shift the parallel adder output a predetermined number of bits right to said multiplicand input means and left to said multiplier register to thereby initiate a succeeding divisor multiply cycle, said fifth gating means being rendered operative when said intermediate result latch of said adder tree contains the results of said succeeding divisor multiply cycle to render said multiplicand connecting means effective to transfer the result of said first dividend multiply cycle to said multiplicand input means shifted right said predetermined number of bits to thereby initiate a succeeding dividend multiply cycle, and result gating means, operative upon completion of a dividend multiply cycle after a particular divisor multiply cycle in which the product has a value equal to 1 within the precision of the original operands, said result gating means being effective to gate the product of the final dividend multiply cycle from said parallel adder to a result register as the quotient of the divide operation.

References Cited

UNITED STATES PATENTS

| | | | |
|---|---|---|---|
| 3,115,574 | 12/1963 | Paul et al. | 235—164 |
| 3,253,131 | 5/1966 | MacSorley et al. | 235—175 X |
| 3,340,388 | 9/1967 | Earle | 235—176 |
| 3,278,732 | 10/1966 | Haynes | 235—164 |
| 3,311,739 | 3/1967 | Aiken et al. | 235—164 |

OTHER REFERENCES

C. S. Wallace: A Suggestion for a Fast Multiplier, IEEE Transactions on Electronic Computers, February 1964, pp. 14–17.

EUGENE G. BOTZ, Primary Examiner

D. H. MALZAHN, Assistant Examiner

U.S. Cl. X.R.

235—165